A. J. GIBSON.
Running-Gear.
No. 11,369.
Patented July 25, 1854
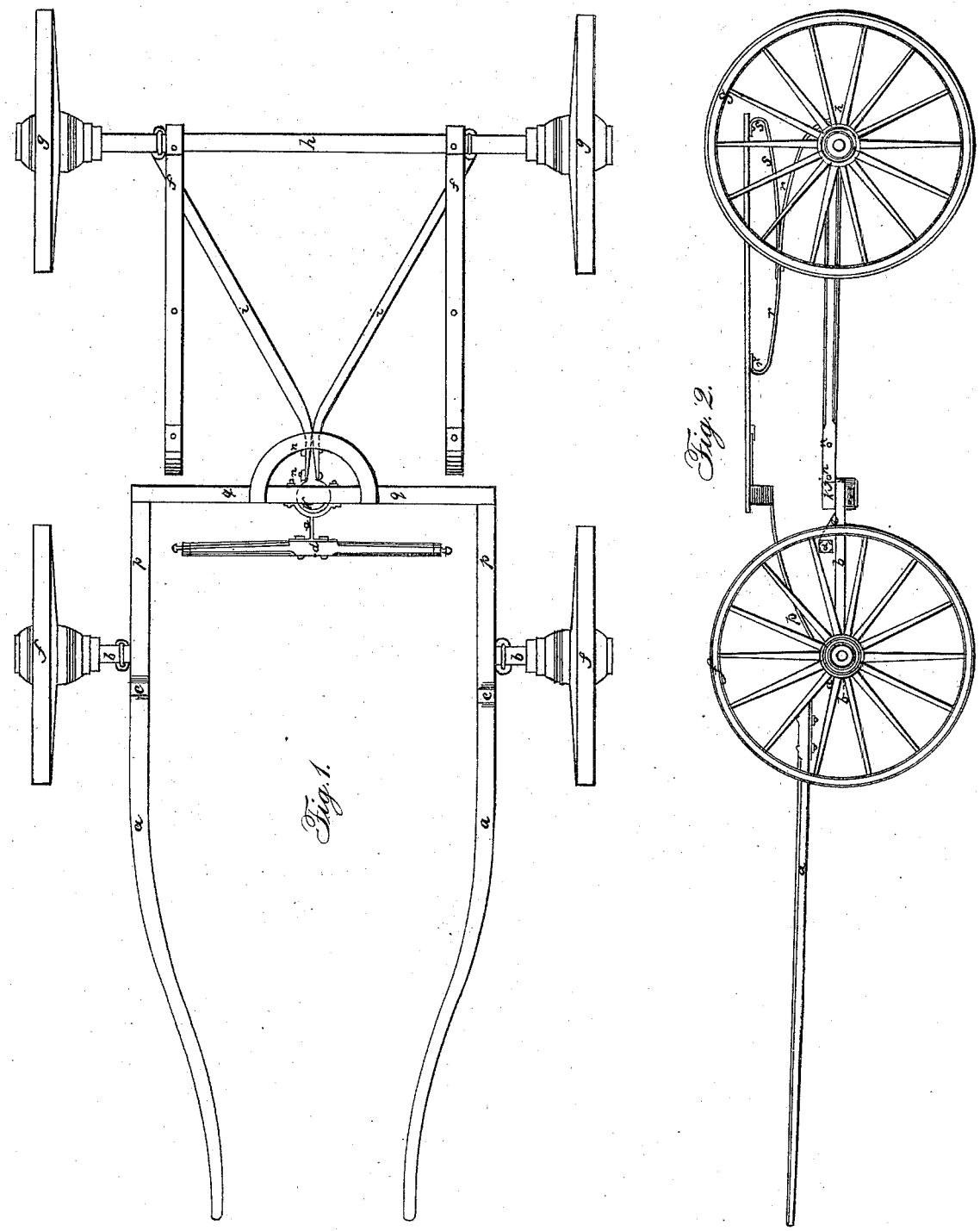

UNITED STATES PATENT OFFICE.

ABRAM J. GIBSON, OF CLINTON, MASSACHUSETTS.

VEHICLE.

Specification of Letters Patent No. 11,369, dated July 25, 1854.

*To all whom it may concern:*

Be it known that I, ABRAM J. GIBSON, of Clinton, in the county of Worcester and State of Massachusetts, have invented a new and useful Improvement in the Construction of the Running Parts of Vehicles; and I do hereby declare that the following is a full, clear, and exact description thereof, reference being had to the accompanying drawings, making a part of this specification, in which—

Figure 1 represents a plan with the body of the vehicle removed. Fig. 2 a side elevation of the same.

The same letters indicate like parts in all the figures.

The nature of my invention consists in the combination of arch springs connected and bearing from axle to axle, and in placing the foremost pair of wheels forward of the point of attachment of the perch and axle; by extending the axle outward, and then giving it a bent form forward, the required length; thence bending the axle outward again, enough to admit of placing the wheels the usual distance apart, and allowing them to revolve. By this means I am enabled to bring the foremost wheels a sufficient distance from the hindmost in order to allow of entering the carriage easily and readily, without coming in contact with either pair of wheels. It also allows of bringing the hindmost wheels forward from their usual position, at the same time preserving the same facilities for entering the carriage above mentioned. By this arrangement, the vehicle is made shorter, and turns in less space than what a straight axle would admit of. By the form and arrangement of springs which support the body of the carriage, (see Figs. 1 and 2,) the amount of material used in making of springs, is reduced, yet the length of bearing is considerably increased, and the strength of springs is fully equal to the elliptical springs in general use. The bearing of springs being equally distributed, gives a steady and easy motion to the vehicle when riding in the same.

Having pointed out the nature of my invention and some of the advantages to be derived from the same, I will now proceed to describe its several parts, reference being had to the drawing in which:

$b$ represents the forward axle bent as above set forth, $p\ p$ represent springs, which are attached to the front of the forward axle $b$, and are bent in a circular form at the point of attachment, then passing along over and above the forward axle $b$, to the front part of the body of the carriage where they are connected together by the flat bar of iron or steel, $g$, which passes along over and above the cylinder $k$ and the forward axle, $b$ directly under the forward part of the body of the carriage.

$r\ r$ represent springs, which are attached to the hind axle $h$, and are bent in a circular form, from the point of attachment, thence in a reverse circle to the center of the body of the carriage where it is made fast.

$s, s$, represent springs which are attached to the hindmost part of the body of the vehicle, and are bolted to the springs $r\ r$, near to the center thereof.

It will be obvious that by this form and arrangement, the weight in the vehicle is equally distributed upon the springs which support the body of the carriage; and as the center of the springs upon which the weight rests is not directly over either axle, any jar, caused from the wheels passing over obstacles in their way, will be communicated to the center of the spring; consequently, the motion given would be easy and light. It will also be seen that by giving a bent form to the forward axle ($b$) as before described, the vehicle may be made to turn in less space without danger from the cramping of the wheels, and also allowing a sufficient space to enter the carriage without coming in contact with the wheels.

Having described the several parts of my invention, what I claim as new and desire to secure by Letters Patent, is—

Giving to the forward axle a bent form in combination with arch springs connected and bearing from axle to axle, for the purpose and in the manner and form, substantially as set forth.

In testimony whereof, I have hereunto signed my name before two subscribing witnesses.

ABRAM J. GIBSON.

Witnesses:
ISAAC BALDWIN,
JOSHUA THISSELL, Jr.